P. W. MOORE.
RAIL ANCHOR.
APPLICATION FILED JULY 17, 1911.
1,008,183.
Patented Nov. 7, 1911.
4 SHEETS—SHEET 1.
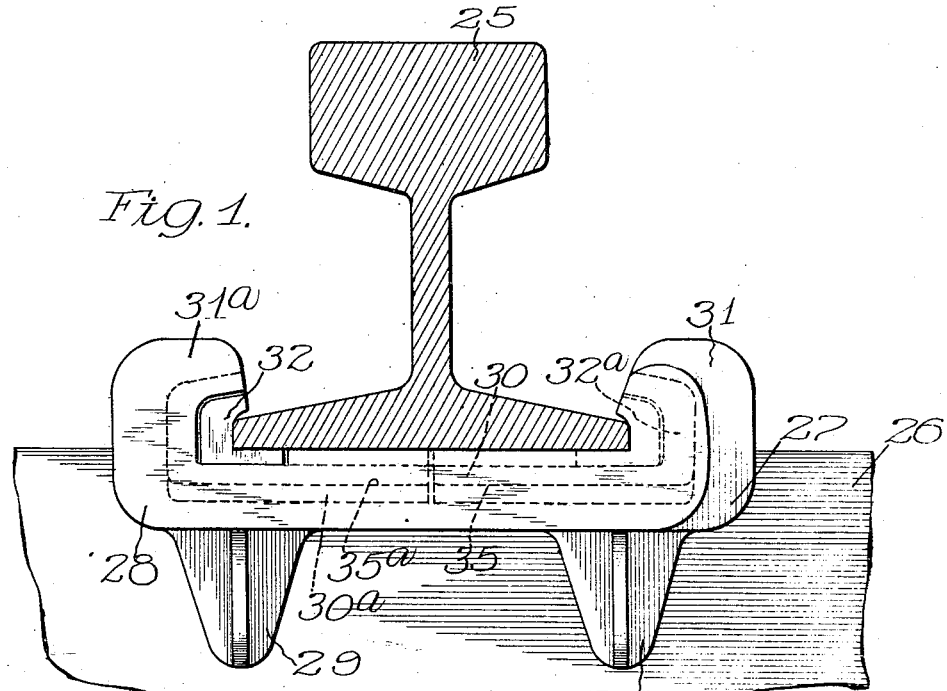
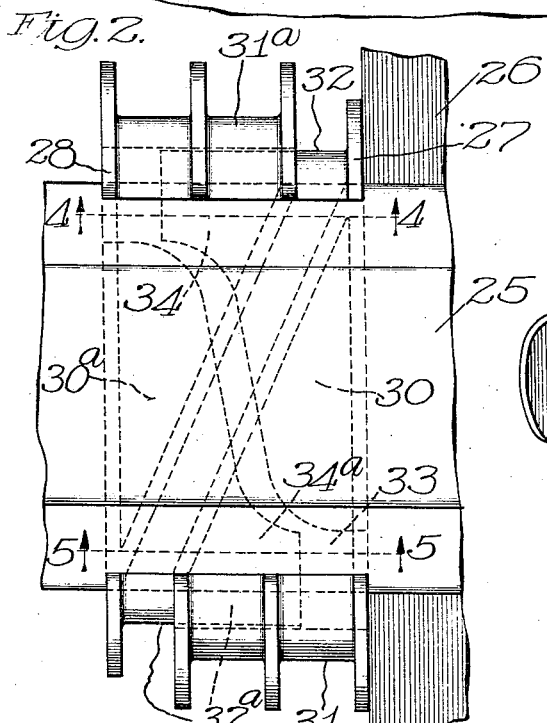
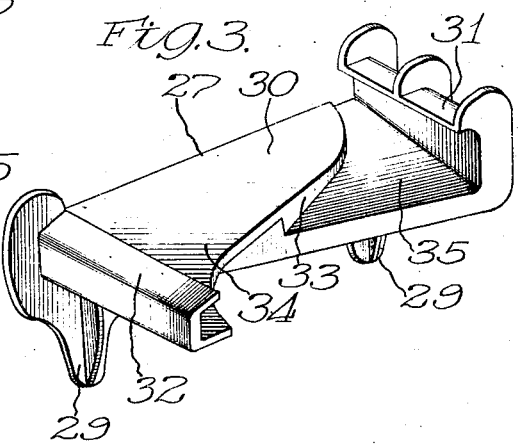

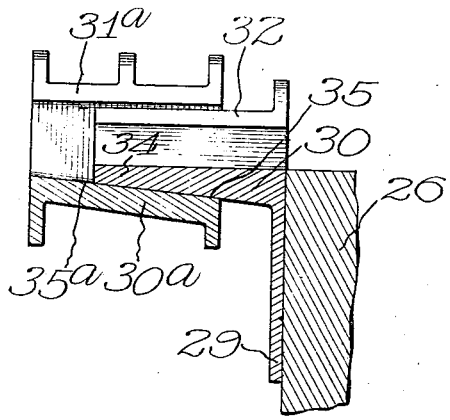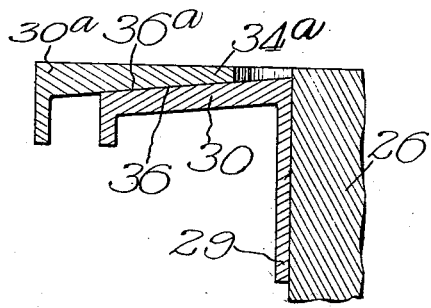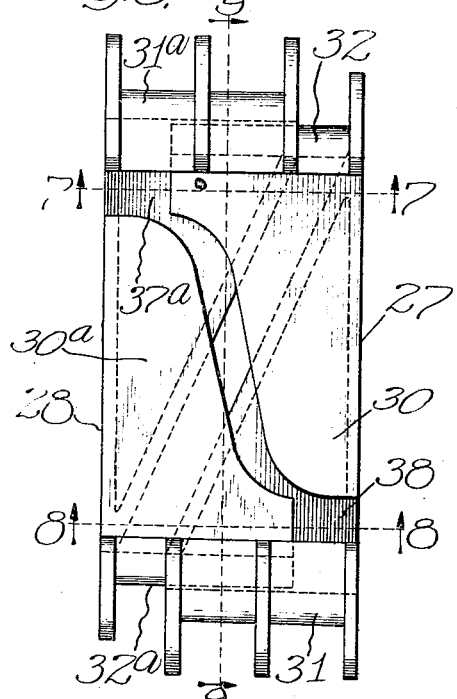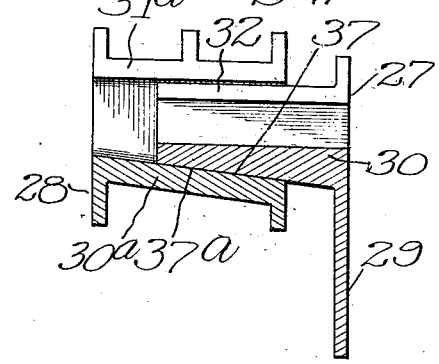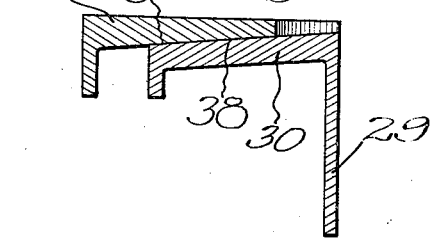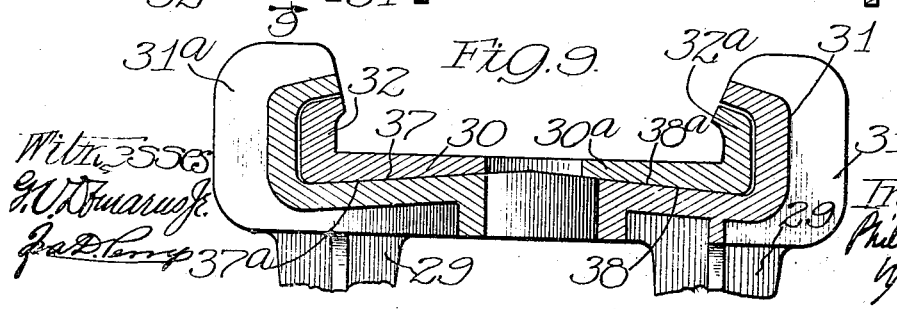

P. W. MOORE.
RAIL ANCHOR.
APPLICATION FILED JULY 17, 1911.
1,008,183.
Patented Nov. 7, 1911.
4 SHEETS—SHEET 3.
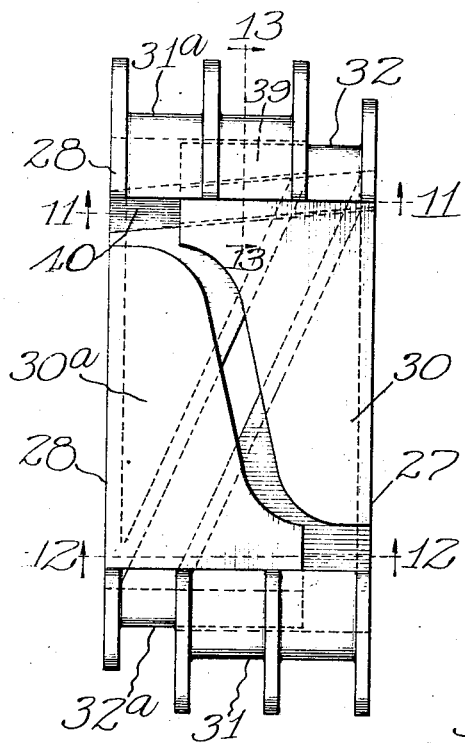
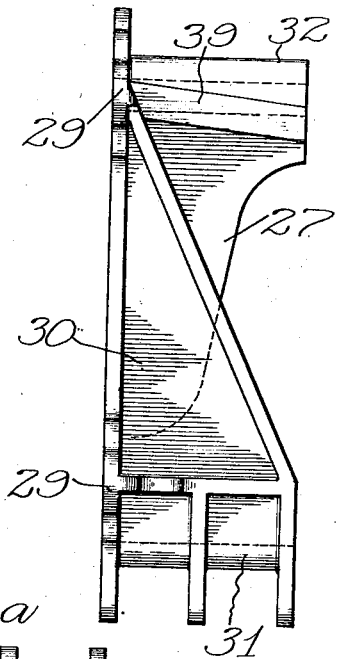
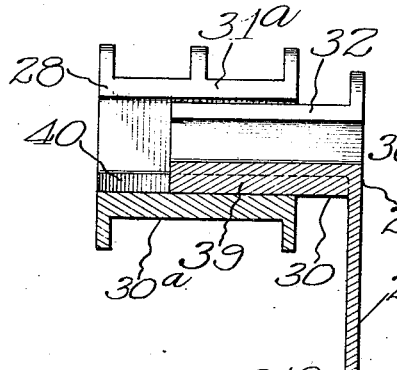
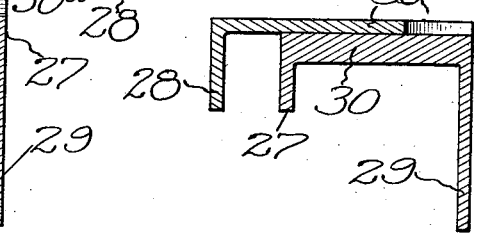
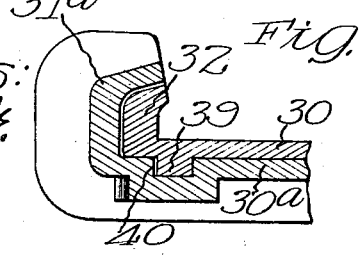

P. W. MOORE.
RAIL ANCHOR.
APPLICATION FILED JULY 17, 1911.
1,008,183.
Patented Nov. 7, 1911.
4 SHEETS—SHEET 4.
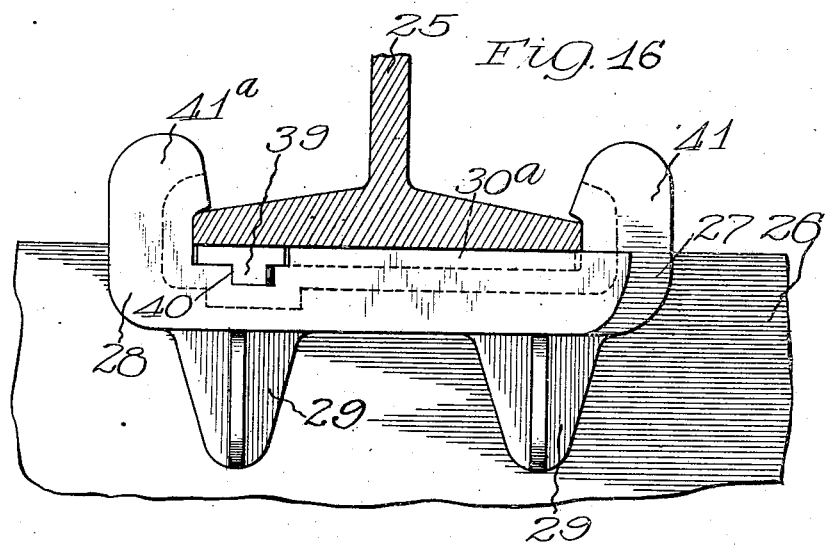
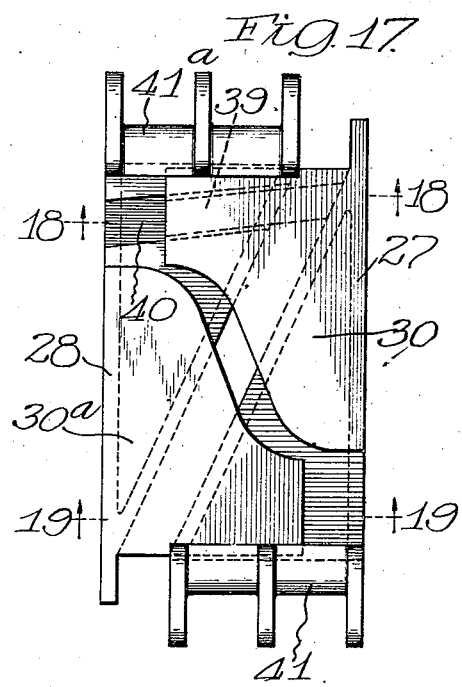
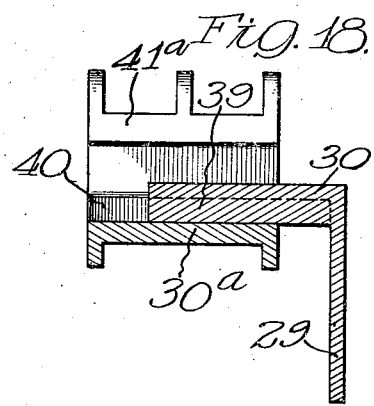
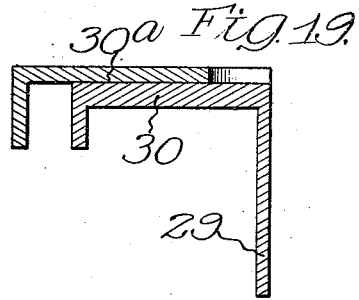
Witnesses:
Inventor:
Philip W. Moore
by R. Barnett
Atty.

UNITED STATES PATENT OFFICE.

PHILIP W. MOORE, OF EVANSTON, ILLINOIS, ASSIGNOR TO THE P. & M. CO., OF CHICAGO, ILLINOIS, A CORPORATION OF ILLINOIS.

RAIL-ANCHOR.

1,008,183.   Specification of Letters Patent.   Patented Nov. 7, 1911.

Application filed July 17, 1911. Serial No. 638,895.

*To all whom it may concern:*

Be it known that I, PHILIP W. MOORE, a citizen of the United States, residing at Evanston, in the county of Cook and State of Illinois, have invented certain new and useful Improvements in Rail-Anchors, of which the following is a specification.

My invention relates to a device for preventing the longitudinal creep of railway rails, devices of this character being commonly called rail anchors, rail stays, or anti-creepers; and the invention has for its object to provide a device of this sort of novel form and construction and having certain improved features to be hereinafter described.

The invention is illustrated, in certain typical embodiments, in the accompanying drawings, wherein—

Figure 1 is an elevation of one form of device shown as applied to the rail, the latter being in section; Fig. 2, a plan view of the form of device shown in Fig. 1; Fig. 3, a view, in perspective, of one of the clamping elements; Figs. 4 and 5 are sectional views taken on, respectively, lines 4—4 and 5—5 of Fig. 2, looking in the direction of the arrows; Fig. 6 is a plan view of a modified form of anchor; Figs. 7, 8 and 9 are sectional views taken on, respectively, lines 7—7, 8—8 and 9—9 of Fig. 6, looking in the direction of the arrows; Fig. 10 is a plan view of another modification; Figs. 11, 12 and 13 are sectional views taken on, respectively, lines 11—11, 12—12 and 13—13 of Fig. 10, looking in the direction of the arrows; Fig. 14 is an inverted plan view of one of the clamping elements of the anchor shown in the preceding four figures; Fig. 15, a fragmentary plan of the complementary element; Fig. 16, a view similar to Fig. 1 illustrating a further modification of the form of anchor shown in Figs. 10 to 15 inclusive; Fig. 17 is a plan view of this modification, and Figs. 18 and 19 are sectional views taken on lines 18—18 and 19—19, respectively, of Fig. 17, looking in the direction of the arrows.

Like characters of reference indicate like parts in the several figures of the drawings.

In all of the figures, 25 designates a railway rail, and 26 one of the ties upon which the rail rests. The anchor, in each case, consists of two coengaging clamping elements designated 27 and 28, one of which, that designated 27, is adapted to be held in a stationary position with respect to the road bed, for example, to be abutted against the tie 26, to which end it is provided with one or more tie abutting flanges or projections 29.

Referring first to Figs. 1 to 5 inclusive, the clamping elements 27, 28 are shown as formed each with a jaw and a base member adapted to extend under the bottom of the rail, the base members being formed at their extremities with jaws which fit into the first mentioned jaws of the complementary clamping elements. Fig. 3 shows the construction of the clamping element 27. 30 designates the base member, 31 a jaw formed at one end of the same, and 32 a smaller jaw formed at the other end. The base member 30 is recessed at one end, as indicated at 33, and at the other is formed with the projecting part 34. The complementary free element 28 is formed with the jaw 31$^a$ which extends over jaw 32 on the element 27, and with the jaw 32$^a$ which fits into jaw 31. The projecting part 34$^a$ of element 28 overlaps and bears upon the recessed portion 33 of element 27. The projecting portion 34 overlaps and bears upon the recessed portion 35$^a$ of the base member 30$^a$ of the complementary element 28.

The above description applies also to the modified forms of my invention shown in Figs. 6 to 9 inclusive and Figs. 10 to 13 inclusive. These three embodiments of the invention differ only in the means employed or configuration given to the complementary clamping elements for the purpose of causing them to grip or clamp the rail. In the form of device shown in Figs. 1 to 5 inclusive the overlapping portions of the base members at opposite ends of the anchor are given a wedge formation, which produces a stress on vertical lines between the superposed surfaces of the rail flange and anchor. That is, the under surface 35 of the base member 30 and the upper surface 35$^a$ of the base member 30$^a$ are inclined downwardly toward the tie (Fig. 4), while the coacting surfaces 36, 36$^a$, at the opposite end of the anchor, are given a corresponding inclination in the opposite direction (Fig. 5). With this construction the clamping action of the anchor on the rail flange is entirely up and down. The anchor exerts no lateral pressure against the rail. In the form of anchor shown in Figs. 6 to 9 inclusive, the two pairs of wedge surfaces, here designated 37, 37$^a$ and 38, 38$^a$, are inclined not only on lines transverse of the anchor, but are also given a slope downwardly from the middle of the anchor toward the jaws as shown particularly in Fig. 9. With the device so constructed the movement of the element 27 toward the tie causes a stress between the anchor and the rail flange having a horizontal as well as a vertical component. In the form of device shown in Figs. 10 to 15 inclusive the element 27 is formed on the under side at one end with an oblique tongue or rib 39 which enters a correspondingly formed groove 40 in the element 28. If desired, the same construction might be employed at the other end of the anchor. The stress of the anchor on the rail resulting from this construction is entirely a lateral stress. The jaws are drawn toward each other clamping the rail between them.

It will be possible to simplify all of the above described embodiments of my invention by eliminating the inner pair of jaws, in which case the outer jaws bear directly upon the rail flange. In Figs. 16 to 19 inclusive I have illustrated this construction as a modification of the form of anchor shown in Figs. 10 to 15 inclusive. Each of the complementary clamping elements has a single jaw and these jaws, designated 41, 41ª, bear directly upon the opposite edges of the rail flange. Obviously the anchors shown in Figs. 1 to 15 inclusive might be similarly modified.

The operation of the invention will be clear from the above description. Suffice it to say that when the device is applied to the rail the clamping element 28 may be driven upon the complementary element 27, which latter is abutted against a tie, until a close clamping fit is obtained between the anchor and the rail. Any tendency of the rail to creep will now be checked by the increased stress between the anchors and the rail which such tendency produces. The construction of the co-engaging clamping elements is such as to resist the tendency of the vibration of the rail to shake the anchor loose. The area of contact between the elements is considerable so that one is given a strong frictional grip on the other. The character of the interlock prevents any rocking motion between the elements. Each of the elements engages with the other element at each end of the device, that is, at each side of the rail. These several features give strength to the anchor as well as holding power.

I claim:

1. A rail anchor comprising in combination two coengaging clamping elements, one of which is adapted to be abutted against a tie or the like, said elements being formed with jaws to engage the rail on opposite sides, and with base members which extend under the rail, each of said members being provided with a projecting part overlapping and bearing upon the other, and coacting wedges which lie underneath the rail by means of which the movement toward the tie of the free element tightens the grip of the anchor on the rail.

2. A rail anchor comprising in combination two coengaging clamping elements, one of which is adapted to be abutted against a tie or the like, said elements being formed with jaws to engage the rail on opposite sides and with base members which extend under the rail, each of said members being provided with a projecting part overlapping and bearing upon the other, and with pairs of coacting wedges at opposite ends of said base members and beneath the rail by means of which the movement toward the tie of the free element tightens the grip of the anchor upon the rail.

3. A rail anchor comprising in combination two coengaging clamping elements, one of which is adapted to be abutted against a tie or the like, said elements being formed with jaws and with base members extending under the rail having jaws which fit into said first mentioned jaws, said base members being formed so that each overlaps a part of the other, and coacting wedges which lie underneath the rail by means of which the movement toward the tie of the free element tightens the grip of the anchor upon the rail.

4. A rail anchor comprising in combination two coengaging clamping elements, one of which is adapted to be abutted against a tie or the like, said elements being formed with jaws to engage the rail on opposite sides and with base members which extend under the rail, each of which is formed with a projecting part overlapping and bearing upon the other, said elements being so conformed that the movement toward the tie of the free element produces a clamping stress between the superposed surfaces of the rail flange and the anchor.

5. A rail anchor comprising in combination two coengaging clamping elements, one of which is adapted to be abutted against a tie or the like, said elements being formed with jaws to engage the rail on opposite sides, and with base members which extend under the rail, each of which is formed with a projecting part overlapping and bearing upon the other, said elements being so conformed that the movement toward the tie of the free element produces a clamping stress between the superposed surfaces of the rail flange and the anchor having vertical and horizontal components.

6. A rail anchor comprising in combination two coengaging clamping elements, one of which is adapted to be abutted against a tie or the like, said elements being formed with jaws to engage the rail on opposite sides and with base members extending under the rail, one of which overlaps and bears upon the other, said overlapped and overlapping portions underneath the rail being formed with coengaging surfaces which are inclined from the horizontal in a direction transverse of the anchor.

7. A rail anchor comprising in combination two coengaging clamping elements, one of which is adapted to be abutted against a tie or the like, said elements being formed with jaws to engage the rail on opposite sides and with base members, one of which overlaps and bears upon the other, said overlapped and overlapping portions formed with coengaging surfaces which are inclined from the horizontal in a direction transverse of the anchor and also longitudinally thereof.

8. A rail anchor comprising in combination two coengaging clamping elements, one of which is adapted to be abutted against a tie or the like, said elements being formed with jaws to engage the rail on opposite sides and with base members extending under the rail, each of which overlaps and bears upon the other, said overlapped and overlapping portions underneath the rail being formed with coengaging surfaces which are oppositely inclined from the horizontal at opposite ends of the anchor.

9. A rail anchor comprising in combination two coengaging clamping elements, one of which is adapted to be abutted against a tie or the like, said elements being formed with jaws to engage the rail on opposite sides and with base members extending under the rail, each of which overlaps and bears upon the other, said overlapped and overlapping portions underneath the rail being formed with coengaging surfaces which are oppositely inclined from the horizontal at opposite ends of the anchor in directions transverse of the anchor.

10. A rail anchor comprising in combination two coengaging clamping elements, one of which is adapted to be abutted against a tie or the like, said elements being formed with jaws to engage the rail on opposite sides and with base members each of which overlaps and bears upon the other, said overlapped and overlapping portions being formed with coengaging surfaces which are oppositely inclined from the horizontal at opposite ends of the anchor in directions transverse of the anchor and which are also inclined downwardly from the middle of the anchor toward the jaws.

11. A rail anchor comprising in combination two coengaging clamping elements, one of which is adapted to be abutted against a tie or the like, said elements being formed with jaws to engage the rail on opposite sides and with base members extending under the rail each of which overlaps and bears upon the other, said overlapped and overlapping portions being formed one with a groove oblique with respect to the rail base and the other with an oblique tongue which enters said groove.

PHILIP W. MOORE.

Witnesses:
G. Y. SKINNER,
L. A. FALKENBERG.

Copies of this patent may be obtained for five cents each, by addressing the "Commissioner of Patents, Washington, D. C."